(12) United States Patent
Soundararajan et al.

(10) Patent No.: US 11,489,676 B2
(45) Date of Patent: Nov. 1, 2022

(54) BLOCKCHAIN INTERNET-OF-THINGS SYSTEM AND RELATED METHOD

(71) Applicant: HEWLETT PACKARD ENTERPRISE DEVELOPMENT LP, Houston, TX (US)

(72) Inventors: Abilash Soundararajan, Bangalore (IN); Michael Reid Tennefoss, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 170 days.

(21) Appl. No.: 17/070,117

(22) Filed: Oct. 14, 2020

(65) Prior Publication Data

US 2021/0126796 A1   Apr. 29, 2021

(30) Foreign Application Priority Data

Oct. 24, 2019 (IN) .............................. 201941043342

(51) Int. Cl.
*H04L 9/32* (2006.01)
*G06F 16/27* (2019.01)
(Continued)

(52) U.S. Cl.
CPC .......... *H04L 9/3247* (2013.01); *G06F 16/215* (2019.01); *G06F 16/27* (2019.01);
(Continued)

(58) Field of Classification Search
CPC ....... H04L 9/3247; H04L 9/0637; H04L 9/30; H04L 9/50; H04L 63/0442; H04L 63/10;
(Continued)

(56) References Cited

U.S. PATENT DOCUMENTS

2015/0379510 A1   12/2015   Smith
2018/0254905 A1   9/2018   Chun
(Continued)

OTHER PUBLICATIONS

Iotex, "The Blockchain & IOT Tech Stack," Dec. 2018, 13 Pgs.
(Continued)

*Primary Examiner* — Mohammed Waliullah
(74) *Attorney, Agent, or Firm* — Hewlett Packard Enterprise Patent Department (57) ABSTRACT

Examples described herein relate to a blockchain Internet-of-Things (IoT) system. The blockchain IoT system include a blockchain IoT device that generates event data and attests the event data using a decentralized identity provisioned to the blockchain IoT device. The blockchain IoT system further includes a blockchain network coupled to the blockchain IoT device via a network. The blockchain network includes a blockchain IoT management sub-system to receive the event data from the blockchain IoT device, verify the decentralized identity associated with the blockchain IoT device, and upon successful verification of the decentralized identity, process the event data. The blockchain network also includes a blockchain ledger sub-system to verify the processed event data and, upon successful verification of the processed event data, store the processed event data in a distributed ledger.

21 Claims, 5 Drawing Sheets

(51) Int. Cl.
*H04L 9/30* (2006.01)
*H04L 9/06* (2006.01)
*H04L 9/00* (2022.01)
*G16Y 10/75* (2020.01)
*G16Y 30/10* (2020.01)
*G06F 16/215* (2019.01)
*G06K 7/10* (2006.01)

(52) U.S. Cl.
CPC .............. *G16Y 10/75* (2020.01); *G16Y 30/10* (2020.01); *H04L 9/0637* (2013.01); *H04L 9/30* (2013.01); *G06K 7/10297* (2013.01); *H04L 9/50* (2022.05)

(58) Field of Classification Search
CPC ............. H04L 9/3239; H04L 2209/805; G06F 16/215; G06F 16/27; G16Y 10/75; G16Y 30/10; G06K 7/10297; H04W 12/08
See application file for complete search history.

(56) References Cited

U.S. PATENT DOCUMENTS

| | | | |
|---|---|---|---|
| 2019/0013948 A1* | 1/2019 | Mercuri | G06F 16/27 |
| 2019/0158470 A1 | 5/2019 | Wright et al. | |
| 2019/0166101 A1* | 5/2019 | Ramos | G06Q 50/265 |
| 2020/0026877 A1* | 1/2020 | Dattatri | G06N 20/00 |
| 2020/0034454 A1* | 1/2020 | Chamarajnager | H04W 4/38 |
| 2020/0098013 A1* | 3/2020 | Mehta | G06Q 30/0201 |
| 2020/0186524 A1* | 6/2020 | Zhou | H04W 4/70 |

OTHER PUBLICATIONS

Yasir, K.R. et al., "Blockchain Integrated Secured Architecture for Advance Wireless Networks in Internet of Things," International Journal of Enterprise Computing and Business Systems, Dec. 2018, vol. 8, pp. 42-47.

* cited by examiner

BLOCKCHAIN INTERNET-OF-THINGS SYSTEM AND RELATED METHOD

BACKGROUND

Generally, "Internet-of-Things" (IoT) refers to the interconnection of devices within a local and/or wide area network infrastructure, including the Internet. The IoT enables a wide-range of applications in which virtually any type of physical thing may provide information about itself or its surroundings and/or may be controlled remotely via client devices.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

"Internet of Things" (IoT) devices when connected over a network or the Internet may enable wide-range of applications for industrial, logistics, and other automation markets. An IoT device may be controlled remotely over the Internet. Examples of an IoT device may include a radio frequency identification (RFID) tag, an RFID scanner, a Near-Field Communication (NFC) reader, a Bluetooth reader, a sensor unit, or combinations thereof.

Further, in recent times, the use of blockchain technology has gained traction because of features including immutable storage of data, validation, and authorization techniques. In a typical blockchain network, data may be stored as a chronologically ordered, back-linked list of data blocks, which form a "blockchain." Numbers of data blocks in the blockchain may be connected together via hashing. For example, when a new block is added to the blockchain, the new block may include a hash reference, such as a hash of a predecessor block. In this manner, several data blocks may be chained together to form the blockchain. Each additional block creates additional security by further validating the entire blockchain, making it difficult to retroactively alter data stored within the blockchain without detection. A blockchain may include information about participating nodes, an owner of a block, and content of blocks starting from a first block and extending to a most recently completed block (also referred to as a latest data block).

Efforts have been made to integrate IoT infrastructure with the blockchain network. Those efforts have been challenging because different mechanisms are used to govern identities in the blockchain network and identities of the IoT devices in the IoT infrastructure. Moreover, the IoT infrastructure may include several IoT devices connected to an IoT gateway via the Internet or private communication links. As will be understood, these IoT devices may generate different types of information, and in different data formats than are used to store data in the blockchain.

To that end, in accordance with the aspects of the present disclosure, a blockchain IoT system is presented including a blockchain IoT device that generates event data and attests the event data using a decentralized identity provisioned to the blockchain IoT device. The blockchain IoT system further includes a blockchain network coupled to the blockchain IoT device via a network. The blockchain network includes a blockchain IoT management sub-system to receive the event data from the blockchain IoT device, verify the decentralized identity associated with the blockchain IoT device, and upon successful verification of the decentralized identity, process the event data. The blockchain network also includes a blockchain ledger sub-system to verify the processed event data, and, upon successful verification of the processed event data, facilitate storage of the processed event data in distributed ledger.

As will be appreciated, the blockchain IoT devices in accordance with various aspects of the present disclosure may be registered with the blockchain network and may be provisioned using the decentralized identity from the blockchain network. Therefore, once the decentralized identity in the event data received from such blockchain IoT devices is verified, the blockchain IoT devices may be considered trusted and the event data may be accepted for further processing. Moreover, the blockchain IoT management subsystem in the proposed blockchain network, in accordance with the aspects of the present disclosure, may process the received event data. Various processing performed by the blockchain IoT management sub-system may include one or more of the following: removing duplicate entries from the event data, arranging parameters contained in the event data in a predefined template, removing a predetermined type of information from the event data thereby retaining at least some contextual information of the event data, and/or any other process for IoT management. Accordingly, the proposed solution facilitates relevant and structured data storage in the distributed storage in the blockchain network.

Figure 1:
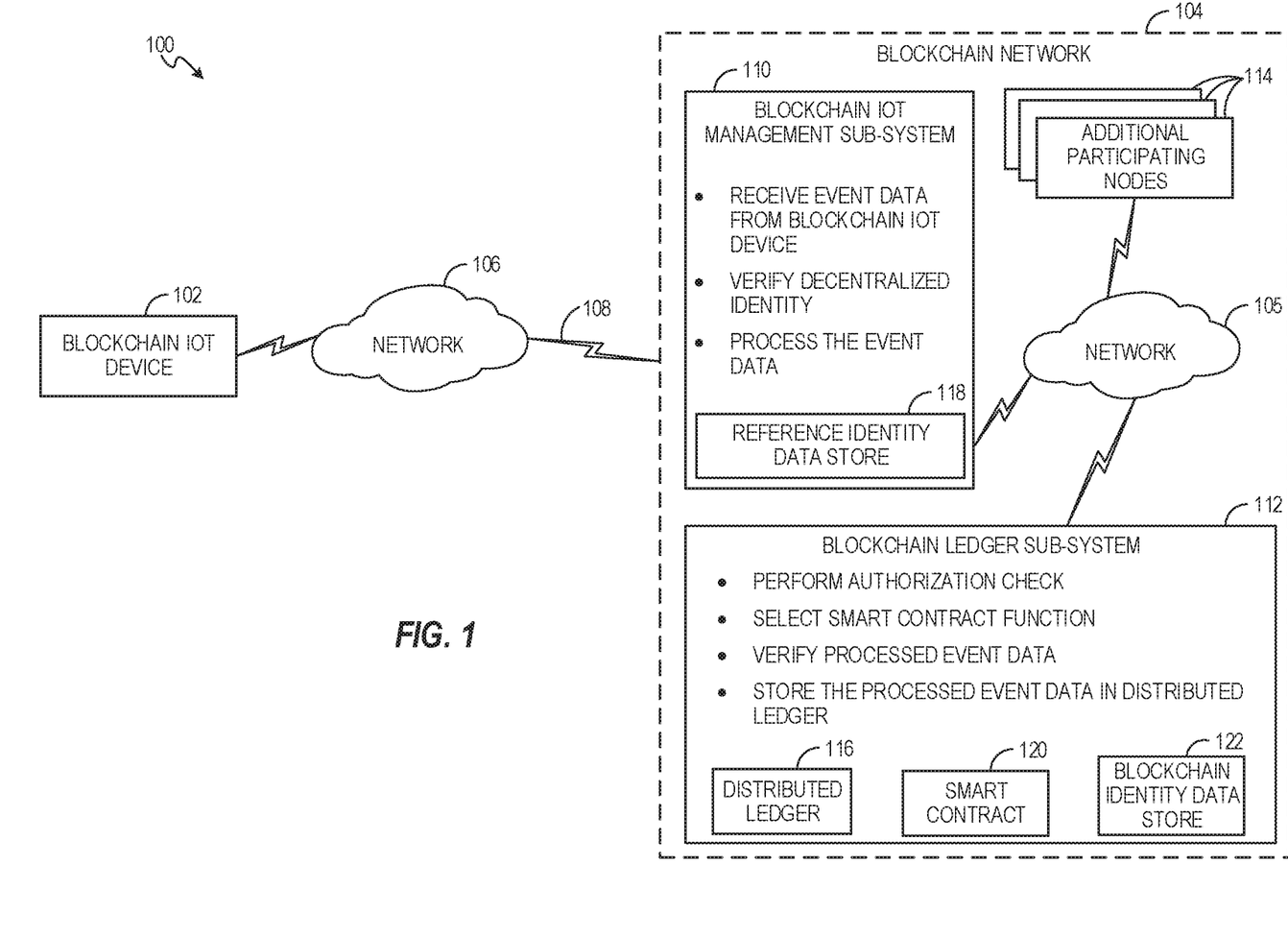
FIG. 1 illustrates a blockchain based Internet-of-Things (IoT) system, in accordance with an example.

Turning to FIG. 1, an example blockchain based Internet-of-things (IoT) system 100 (hereinafter referred to as a blockchain IoT system 100) is illustrated. As shown in FIG. 1, blockchain IoT system 100 may include a blockchain IoT device 102 and a blockchain network 104. Blockchain network 104 may be coupled to blockchain IoT device 102 via a network 106.

Example network 106 may be a medium that interconnects blockchain IoT device 102 and blockchain network 104. Examples of network 106 may include, but are not limited to, an Internet Protocol (IP) or non-IP-based local area network (LAN), wireless LAN (WLAN), metropolitan area network (MAN), wide area network (WAN), a cellular communication network, and the Internet. Communication over network 106 may be performed in accordance with various communication protocols such as, but not limited to, Transmission Control Protocol and Internet Protocol (TCP/IP), User Datagram Protocol (UDP), IEEE 802.11, and/or cellular communication protocols over communication links 108. Communication links 108 may be enabled via a wired (e.g., copper, optical communication, etc.) or wireless (e.g., Wi-Fi®, cellular communication, satellite communication, Bluetooth, etc.) communication technologies. In some examples, network 106 may be enabled via private communication links including, but not limited to, communication links established via Bluetooth, cellular communication, optical communication, radio frequency communication, and the like.

Although one example blockchain IoT device 102 is depicted in FIG. 1 for purposes of clarity and conciseness, blockchain IoT system 100 may include any number of blockchain IoT devices. Examples of blockchain IoT device 102 may include, but are not limited to, an RFID tag, an RFID scanner, a Bluetooth device, an NFC reader, a Bluetooth reader, a sensor unit, or combinations thereof. In some examples, the Bluetooth device may be a Bluetooth Low Energy (BLE) device or a BLE tag. As will be understood, during operation, blockchain IoT device 102 may generate data, hereinafter referred to as event data. By way of example, blockchain IoT device 102 may be an RFID scanner and may generate event data that is representative of particulars associated with an RFID tag being scanned by the RFID scanner. The particulars associated with the RFID tag may include information pertaining to an object (e.g., device, component, machine, etc.) to which the RFID tags is applied. As another example, blockchain IoT device 102 may be a Bluetooth reader and may generate event data that is representative of particulars associated with a Bluetooth device associated with an object.

In some examples, the event data generated by blockchain IoT device 102 may be communicated to blockchain network 104 via network 106. Blockchain IoT device 102 may send the event data to a blockchain IoT management sub-system 110, as described further herein, of blockchain network 104 when an event occurs. The term "event" as used herein may refer to an act that causes blockchain IoT device 102 to generate event data. For example, an event may be an instance when blockchain IoT device 102 such as the RFID scanner scans the RFID tag which causes the RFID scanner to generate event data (e.g., particulars associated with the RFID tag).

In some examples, blockchain IoT device 102 may be assigned an identity. The identity assigned to blockchain IoT device 102 may uniquely identify blockchain IoT device 102 amongst other IoT devices (not shown). The term "decentralized identity" as used herein may refer to a self-sovereign identifier provisioned to blockchain IoT device 102 without any intervening or centralized administrative authorities. For example, in blockchain IoT system 100 of FIG. 1, the decentralized identity may be provisioned to blockchain IoT device 102 from blockchain network 104, as described in greater detail herein. The decentralized identity may be used by blockchain IoT device 102 to present a verifiable claim to blockchain network 104. In particular, blockchain IoT device 102 may sign or attest the event data generated by blockchain IoT device 102 using its decentralized identity. In some examples, the event data generated by blockchain IoT device 102 may include a signature based on its decentralized identity.

In accordance with some aspects of the present disclosure, the decentralized identity may include a public key, a private key, and/or an attribute corresponding to blockchain IoT device 102 issued by blockchain network 104 to blockchain IoT device 102. The term "attribute" as used herein may refer to one or more additional identification details of blockchain IoT device 102 including, but not limited to; a class of blockchain IoT device 102; identification number of blockchain IoT device 102; details of a custodian of blockchain IoT device 102; a name or identification of an organization at which blockchain IoT device 102 is deployed; a geographical location of the organization; information about infrastructure of the organization in which blockchain IoT device 102 is deployed; a physical location of blockchain IoT device 102; e.g. a floor of the building in which blockchain IoT device 102 is deployed, a zone on the floor in which blockchain IoT device 102 is deployed, location coordinates of blockchain IoT device 102, etc. In some examples, the decentralized identity may be maintained in the form of a Decentralized Identifier (DID) document that describes how to use that specific decentralized identity.

As noted herein, blockchain network 104 may be coupled to blockchain IoT device 102 via network 106. Blockchain network 104 may be implemented as a public blockchain network, a private blockchain network, or a hybrid blockchain network having a combination of both the public blockchain network and the private blockchain network. As used herein, the term "public blockchain network" may refer to a blockchain network that is accessible to any entity and whereby any entity may participate in a consensus process in the public blockchain network. The term entity used herein may refer to a participating node in a blockchain network (e.g., the public blockchain network in this case). A public blockchain network may also be referred to as a "fully decentralized" blockchain network.

Further, the term "private blockchain network" as used herein, may refer to a blockchain network where a limited set of trusted entities (e.g., participating nodes) participate. In particular, in a private blockchain network, a permissioned set of participating nodes may participate in the consensus process. By way of example, a consortium of multiple financial institutions may form a private blockchain network. A right to read blockchain data from the private blockchain network may be restricted to trusted participating nodes. The private blockchain network may also be referred to as a permissioned blockchain network. Although some examples are described herein with respect to the private blockchain network, it should be appreciated that the technology disclosed herein may be adapted for use in public or hybrid blockchain networks.

Blockchain network 104, as depicted in FIG. 1, may be implemented as a consortium. For example, blockchain network 104 may be implemented by an enterprise consortium of companies that operate blockchain network 104. By way of example, blockchain network 104 may include a plurality of participating nodes, including but not limited to, blockchain IoT management sub-system 110, a blockchain ledger sub-system 112, and/or one or more additional participating nodes 114.

Each of participating nodes 110, 112, 114 may be a computing node such as a computer, a device including a processor or microcontroller, and/or any other electronic component, device or system that performs one or more operations according to one or more programming instructions. Examples of participating nodes 110, 112, and 114 may include, but are not limited to, a desktop computer, a laptop, a smartphone, a server system, a computer appliance, a workstation, and the like. In blockchain network 104, participating nodes 110, 112, 114 may be connected to each other via a network 105. In some examples, network 105 may be analogues to network 106. In certain examples, participating node 110, 112, 114 may be connected to each other via network 106.

Although not shown, each of participating nodes 110, 112, 114 may include at least one processing resource and a machine readable medium. Non-limiting examples of the processing resource may include a microcontroller, a microprocessor, central processing unit core(s), application-specific integrated circuit (ASIC), a field programmable gate array (FPGA), etc. The machine readable medium may be a non-transitory storage medium, examples of which include, but are not limited to, a random access memory (RAM), a read-only memory (ROM), an electrically erasable programmable read-only memory (EEPROM), a flash memory, a hard disk drive, etc. The processing resource may execute instructions (i.e., programming or software code) stored on the machine readable medium to perform operations desired to be performed by participating nodes 110, 112, 114. Additionally or alternatively, the processing resource may include electronic circuitry for performing the functionality described herein.

In blockchain network 104, some or all of participating nodes 112 and 114 may include a copy of a distributed ledger. For convenience of representation, blockchain ledger sub-system 112 is shown to include one copy of such distributed ledger 116. As used herein, the term "distributed ledger" may refer to a shared digital ledger that is decentralized and synchronized among participating nodes 112, 114 distributed across blockchain network 104. After a transaction that is approved to be written or stored to distributed ledger 116, the transaction is consented by at least the majority of participating nodes 112, 114. The contents of distributed ledger 116 are synchronized across participating nodes 112, 114. Different types of consensus mechanisms may be implemented on participating nodes 112, 114 to bring in varying levels of processing requirements to agree on the transaction amongst participating nodes 112, 114. Examples of common consensus mechanisms may include, but are not limited to, proof of work, proof of stake, proof of elapsed time, and/or consensus platforms such as a Kafka distributed streaming platform. In some examples, when a new participating node is added in blockchain network 104, a copy of distributed ledger 116 may be downloaded to the newly joined participating node.

In distributed ledger 116, data is generally stored as a blockchain of chronologically ordered, back-linked list of data blocks. A number of data blocks in the blockchain are connected together via use of hashing. For example, when a new block is added to the blockchain, the new block includes a hash reference such as a hash of a predecessor block. In this manner, several data blocks may be chained together to form a blockchain and each additional block creates additional security for a validity of the entire blockchain. This makes it difficult to retroactively alter data stored within the blockchain without that alteration being detected. A blockchain may include information about participating nodes, an owner of a block, and content of the block right from the first block to the most recently completed block (also referred to as a latest data block).

In some example implementations, participating nodes 112, 114 in blockchain network 104 may be able to write/store transactions on distributed ledger 116, but not verify transactions. In the example of FIG. 1, blockchain IoT management sub-system 110 may be operated as a verifier that verifies the decentralized identity of blockchain IoT device 102. In some examples, blockchain IoT device 102 may be registered with blockchain IoT management sub-system 110. In some examples, during such registration, blockchain IoT management sub-system 110 may provision the decentralized identity to blockchain IoT device 102. Also, blockchain IoT management sub-system 110 may store some of the decentralized identity information of blockchain IoT device 102 in a reference identity data store 118. For instance, reference identity data store 118 may store decentralized identity of all blockchain IoT devices registered with blockchain IoT management sub-system 110. By way of example, reference identity data store 118 may include a reference public key, a reference attribute, or both corresponding to each of the registered blockchain IoT devices. The blockchain IoT devices that may be registered with blockchain IoT management sub-system 110 are hereinafter referred to as valid devices from which blockchain IoT management sub-system 110 may accept the event data.

During operation, blockchain IoT management sub-system 110 may receive the event data from blockchain IoT device 102 via network 106. In some examples, in order to ensure that the event data is sent by a valid blockchain IoT device, blockchain IoT management sub-system 110 may verify the decentralized identity contained in the received event data. In order to verify the decentralized identity, blockchain IoT management sub-system 110 may extract a signature from the received event data and validate the signature using reference identity data store 118. In some examples, blockchain IoT management sub-system 110 may validate the signature using the reference public key corresponding to blockchain IoT device 102. If decentralized identity of blockchain IoT device 102 is successfully verified, blockchain IoT management sub-system 110 may accept the event data received from blockchain IoT device 102. Alternatively, blockchain IoT management sub-system 110 may reject or discard the event data received from blockchain IoT device 102.

In certain instances, the event data received from blockchain IoT device 102 may be unstructured, may include additional data that is irrelevant to a given business application or utility, and/or may contain redundant information.

Therefore, upon successful verification of the decentralized identity of blockchain IoT device 102, blockchain IoT management sub-system 110 may process the event data received from blockchain IoT device 102 to generate processed event data. In some examples, to facilitate such processing of the event data, blockchain IoT management sub-system 110 may remove duplicate entries from the event data. Accordingly, after removal of the duplicate entries from the event data by blockchain IoT management sub-system 110, the resulting processed event data may include unique entries.

Further, in some other examples, to facilitate the processing of the event data, blockchain IoT management sub-system 110 may remove a predetermined type of information from the event data thereby retaining at least some contextual information. For instance, blockchain IoT management sub-system 110 may remove the predetermined type of information, such as any additional information that is irrelevant to the given business application or utility. For example, if a business application requires only a location of an RFID tag to be stored in distributed ledger 116, blockchain IoT management sub-system 110 may remove any data other than the location information of the RFID tag from the received event data. In another example, if blockchain IoT device 102 is a sensor unit which may sense various parameters such as a temperature, a pressure, a humidity, and a carbon dioxide content in a facility premises, blockchain IoT device 102 may generate event data that includes information including these parameters. Upon receipt of the event data from the sensor unit and after successful verification of the decentralized identity of the sensor unit, blockchain IoT management sub-system 110 may remove information regarding the pressure and the carbon dioxide content from the received event data if only temperature and humidity related information is desired to be retained. Therefore, once any such irrelevant additional information is removed, the resulting processed event data may include only desired contextual information.

Furthermore, in certain examples, to facilitate the processing of the event data, blockchain IoT management sub-system 110 may arrange parameters contained in the event data in a predefined template, wherein the processed event data includes the event data arranged in the predefined template. By way of example, if the predefined template includes the parameters to be listed in a particular order, blockchain IoT management sub-system 110 may arrange the parameters in the particular order. For instance, if the predefined template requires the humidity information to be presented after the temperature information, blockchain IoT management sub-system 110 may arrange the humidity information after the temperature information in the processed event data. As will be appreciated, the predefined template may be selected to be any template, format, arrangement, and/or order of data as desired by the business application for storing the data in distributed ledger 116. Although the predefined template as illustrated herein relates to an order of presenting various parameters, any type of predefined template may be chosen without limiting the scope of the present disclosure. During this process blockchain IoT Management sub-system 110 may use the public key of blockchain IoT device 102 to validate the signature of the event data and once it creates the processed event data as per business needs, may sign the processed event data with its private key.

In the example of FIG. 1, blockchain IoT management sub-system 110, as described, verifies the decentralized identity and processes the event data. In some other examples, while blockchain IoT management sub-system 110 may perform one of the two functionalities (e.g., processing the event data), the remaining other functionality (e.g., verifying the decentralized identity) may be performed by a different participating node (e.g., one of additional participating nodes 114 or blockchain ledger sub-system 112), without limiting the scope of the present disclosure.

In accordance with some aspects of the present disclosure, blockchain IoT management sub-system 110 may communicate the processed event data to blockchain ledger sub-system 112. Blockchain ledger sub-system 112 may verify the processed event data prior to it being stored in distributed ledger 116. In some examples, blockchain ledger sub-system 112 may perform an authorization check for the one or both of blockchain IoT device 102 or blockchain IoT management sub-system 110 based on the identities of blockchain IoT device 102 or blockchain IoT management sub-system 110, and parameters contained in the processed event data. In some examples, blockchain ledger sub-system 112 may perform an authorization check to select a function (hereinafter referred to as a smart contract function) of a smart contract 120 corresponding to one or more of blockchain IoT device 102, blockchain IoT management sub-system 110, and the parameters contained in the processed event data.

In some examples, blockchain ledger sub-system 112 may use identity information stored in a blockchain identity data store 122 to perform the authorization of blockchain IoT device 102 and blockchain IoT management sub-system 110. Blockchain identity data store 122 may include identity information (i.e., decentralized identities) corresponding to all devices, parties, and systems that can communicate with blockchain ledger sub-system 112. In some examples, reference identity data store 118 stored in blockchain IoT management sub-system 110 may provide reference to the identity information stored in blockchain identity data store 122 which is further stored in blockchain ledger sub-system 112. In certain other examples, reference identity data store 118 may be downloaded by blockchain IoT management sub-system 110 from blockchain identity data store 122. As previously noted, the identity information such as the decentralized identity may also include attributes corresponding to a given device.

For a particular blockchain IoT device, in a given context, only certain parameters may be expected in the processed event data. For example, if an RFID scanner associated with an airport-A scans RFID tags associated with an airport-B, event data from the RFID scanner may be rejected. When the RFID scanner reports a correct and relevant attribute with a right digital signature, based on the attribute, corresponding processed event data may be considered for further processing by blockchain ledger sub-system 112. During the authorization check, blockchain ledger sub-system 112 may authorize blockchain IoT device 102 and blockchain IoT management sub-system 110 for certain context applicable thereto. For example, a blockchain IoT device may be authorized for use in scanning RFID tags located in a given facility premises (e.g., the paint shop of an automobile factory) but not in other facility premise (e.g., a robotic welding area of the automobile factory). In such a scenario, if such blockchain IoT device is used to scan an RFID tag in the unauthorized premise, blockchain ledger sub-system 112 may disqualify the processed event data containing the event data generated by such blockchain IoT device based on scanning of the RFID tag in the unauthorized premise. In another example, if blockchain IoT management sub-system 110 submits processed event data pertaining to a blockchain IoT device for which blockchain IoT management sub-system 110 is not authorized, blockchain ledger sub-system 112 may disqualify such processed event data from being stored in distributed ledger 116.

Moreover, blockchain ledger sub-system 112 may allow the receipt of the processed event data from a blockchain IoT management sub-system or the blockchain IoT device that is authorized for a given context. For example, if a blockchain IoT device is authorized for use in scanning RFID tags located in the paint shop of the automobile factory, blockchain ledger sub-system 112 may authorize such blockchain IoT device if associated processed event data corresponds to the paint shop of the automobile factory.

As noted earlier, blockchain ledger sub-system 112 may perform an authorization check to select the smart contract function of smart contract 120 corresponding to one or more of blockchain IoT device 102, blockchain IoT management sub-system 110, and the parameters contained in the processed event data. The term "smart contract" as used herein may refer to a processor executable code residing in a blockchain network, e.g., blockchain network 104. Smart contract 120 automates execution of transactions between trusted parties (i.e., parties who have proved their credentials) based on processor executable contract terms. Transactions that happen via smart contract 120 are processed on blockchain network 104 without any intermediator. In the present scenario, in some examples, smart contract 120 may include various program instructions—execution of which may verify if the processed event data received from blockchain IoT management sub-system 110 meets a desired criteria. In some examples, the processed event data may include values of one or more parameters. The desired criteria may, for example, be a predetermined range, or a minimum and/or maximum threshold value. In some examples, smart contract 120 may include smart contract functions for various businesses and business contexts, consistent with any participating nodes, e.g. participating nodes 110, 112, and/or 114, of blockchain network 104.

In some examples, blockchain ledger sub-system 112 may select a smart contract function relevant to one or more of blockchain IoT device 102, blockchain IoT management sub-system 110, or parameters contained in the processed event data. Further, blockchain ledger sub-system 112 may execute the selected smart contract function, thereby performing the verification of the processed event data for storing the event data in distributed ledger 116.

Upon successful verification of the processed event data as noted herein, blockchain ledger sub-system 112 may store the processed event data in a distributed ledger 116. In some examples, blockchain ledger sub-system 112 may require consent from all or at least a majority of participating nodes 112, 114 for storing the processed event data in distributed ledger 116. For example, upon successful verification of the processed event data, blockchain ledger sub-system 112 may determine whether consensus for storing the processed event data was reached among participating nodes 112, 114 in blockchain network 104. Different types of consensus mechanisms or programs may be used by participating nodes 112, 114 to implement varying levels of processing requirements to agree on a transaction (e.g., a request for storing the processed event data in the present example) amongst participating nodes 112, and 114 in blockchain network 104. Examples of the consensus mechanisms may include, but are not limited to, proof of work, proof of stake, proof of elapsed time, or Kafka.

Upon successful consensus among participating nodes 112, 114, blockchain ledger sub-system 112 may store the processed event data as a record or block in distributed ledger 116. Alternatively or additionally, in some examples, blockchain ledger sub-system 112 may store the processed event data in distributed ledger 116 as a verifiable claim to prove that blockchain ledger sub-system 112 possesses verifiable credentials with certain characteristics. The verifiable claim may represent the processed event data signed by blockchain ledger sub-system 112 using the verifiable credentials associated with the blockchain ledger sub-system 112. The verifiable credentials may be verified by any verifier in blockchain network 104. Information of the processed event data and/or the verifiable claim may be stored as a block in a blockchain of chronologically ordered, back-link listed data blocks.

In some examples, the information of the processed event data to be stored in the blockchain may include content of the processed event data, a cryptographic hash value of the content of the processed event data, a metadata corresponding to the processed event data, a cryptographic hash value of the metadata, or combinations thereof. Data blocks in the blockchain may be connected together via hashing. For example, when a new block is added to the blockchain, the new block includes a hash reference such as a hash of a predecessor block. In this manner, the several data blocks may be chained together to form a blockchain and each additional block creates additional security for a validity of the entire blockchain. This makes it difficult to retroactively alter data stored within the blockchain without that alteration being detected. A blockchain has complete information about the participating nodes, an owner of a block, and content of the block right from the first block to the most recently completed block (also referred to as a latest data block). Accordingly, a blockchain provides high security and has a lower probability of being breached.

In the example of FIG. 1, the functionalities of verifying the decentralized identity, processing the event data, verifying the processed event data, and storing the processed event data are shown to be performed by different participating nodes 110, 112. As will be appreciated, the operations performed by blockchain IoT management sub-system 110 and blockchain ledger sub-system 112 may be performed on a single participating node as well, without limiting the scope of the present disclosure.

As will be appreciated, blockchain IoT device 102, in accordance with some aspects of the present disclosure may be registered with blockchain IoT management sub-system 110 and may be provisioned the decentralized identity from blockchain IoT management sub-system 110. Therefore, once the decentralized identity in the event data received from such blockchain IoT device 102 is verified, blockchain IoT device 102 may be considered trusted and the event data may be accepted for further processing. Moreover, blockchain IoT management sub-system 110 in the proposed blockchain network 104, in accordance with some aspects of the present disclosure, may process the received event data to generate the processed event data. Various processing performed by blockchain IoT management sub-system 110 may include one or more of the following: removing duplicate entries from the event data, arranging parameters contained in the event data in a predefined template, and/or removing a predetermined type of information from the event data thereby retaining at least some contextual information of the event data. Accordingly, the proposed solution facilitates relevant and structured data in the blockchain network for storage in distributed ledger 116.

Figure 2:
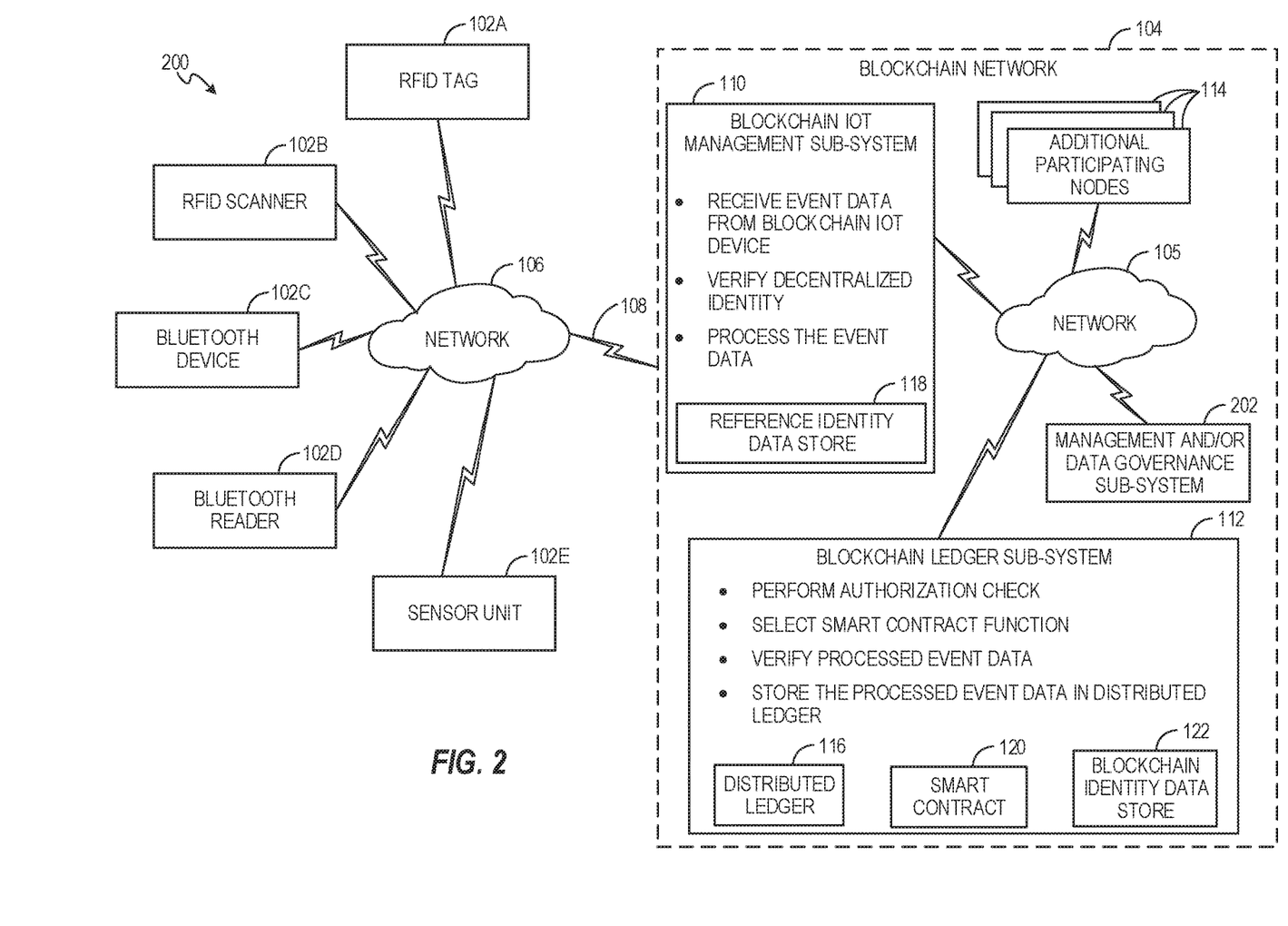
FIG. 2 illustrates a blockchain based IoT system, in accordance with another example.

FIG. 2 illustrates a blockchain based IoT system 200 in accordance with another example. Blockchain based IoT system 200 (hereinafter referred to as a blockchain IoT system 200) may include certain elements similar to those described in FIG. 1 which are marked with similar reference numerals, description of which are not repeated herein. In comparison to FIG. 1, the example blockchain IoT system 200 of FIG. 2 is shown to include multiple different types of blockchain IoT devices. For example, the blockchain IoT devices, as depicted in FIG. 2, may include but are not limited to, an RFID tag 102A, an RFID scanner 102B, a Bluetooth device 102C, a Bluetooth reader 102D, a sensor unit 102E, and/or combinations thereof. Bluetooth device 102O may be a BLE device or a BLE tag.

In a similar fashion as described in FIG. 1, the blockchain IoT devices, such as RFID tag 102A, RFID scanner 102B, Bluetooth device 102C, Bluetooth reader 102D, and sensor unit 102E, may be registered with blockchain IoT management sub-system 110 and may be assigned a respective decentralized identity. During operation, blockchain IoT devices 102A-102E may generate respective event data and attest or sign the event data using the respective decentralized identity. Blockchain IoT devices 102A-102E may also communicate the event data to blockchain IoT management sub-system 110 in blockchain network 104. Upon receipt of the event data, blockchain IoT management sub-system 110 and blockchain ledger sub-system 112 may perform similar operations as described in conjunction with FIG. 1.

Further, in some examples, blockchain IoT system 200 may include a management and/or data governance sub-system 202. Management and/or data governance sub-system 202 may be a computing device similar to any of participating nodes 110, 112, and 114, and may include a processing resource and machine-readable medium similar to those described in FIG. 1. In some examples, management and/or data governance sub-system 202 may provide secure access to blockchain information stored in distributed ledger 116 to a requester, depending on access rights associated with the requester. The requester may be a user, a customer, a computing node, or a company. The requester may connect to the management and/or data governance sub-system 202 via use of one or more applications and/or application programming interface (API) calls. It is to be noted that management and/or data governance sub-system 202 is shown as a separate participating node in blockchain IoT system 200 for illustration purposes. In some examples, the functionalities performed by management and/or data governance sub-system 202 may be embedded into any of participating nodes 110, 112, and 114, without limiting the scope of the present disclosure.

Figure 3:
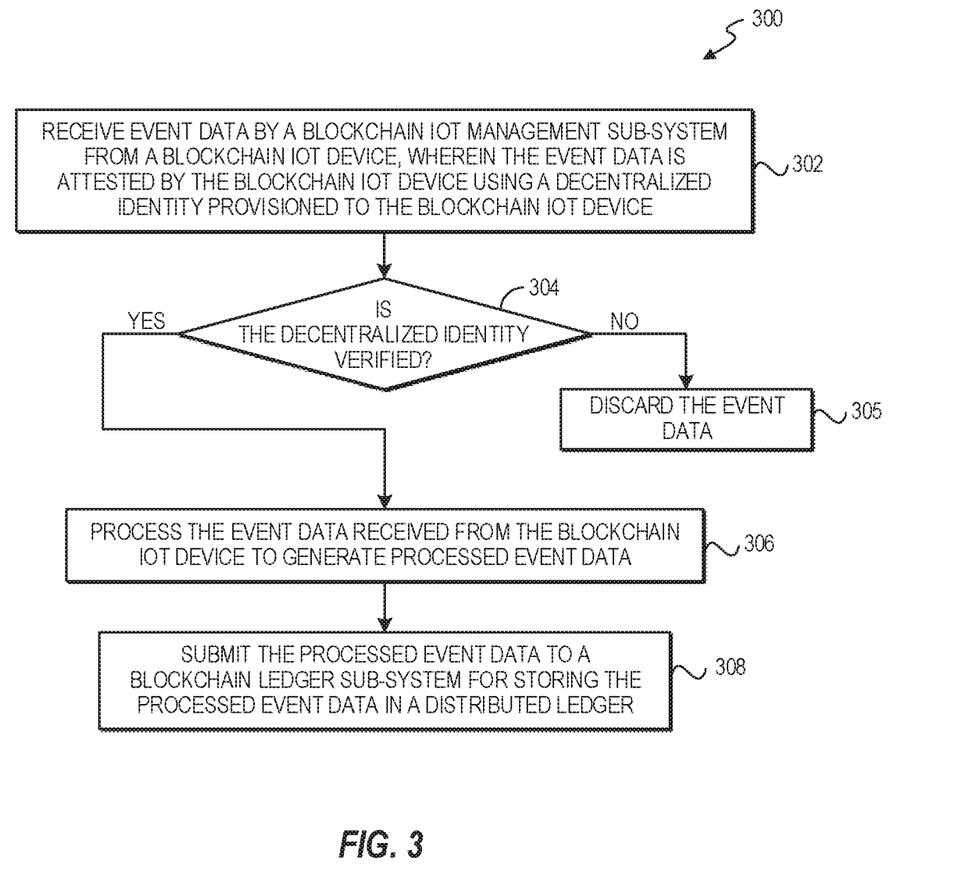
FIG. 3 is a flow diagram depicting a method for storing IoT device data in a blockchain system, in accordance with an example.

FIG. 3 is a flow diagram depicting a method 300 for storing IoT device data as a blockchain in blockchain network 104, in accordance with an example. For ease of illustration, method 300 will be described with reference to blockchain IoT system 100 of FIG. 1. As will be appreciated, features described herein may also be applicable to blockchain IoT system 200 of FIG. 2.

At block 302, method 300 includes receiving event data by blockchain IoT management sub-system 110 from blockchain IoT device 102. As previously noted, the received event data may be attested by blockchain IoT device 102 using the decentralized identity provisioned to blockchain IoT device 102 from blockchain IoT management sub-system 110. Further, at block 304, a check may be performed by blockchain IoT management sub-system 110 to verify the decentralized identity associated with blockchain IoT device 102. In some examples, verifying the decentralized identity includes validating the signature contained in the event data using reference identity data store 118. For example, veri-fying the decentralized identity includes validating the signature contained in the event data using the reference public key corresponding to blockchain IoT device 102.

At block 304, if the decentralized identity associated with blockchain IoT device 102 is not verified, blockchain IoT management sub-system 110 may discard the event data received from blockchain IoT device 102 as indicated at block 305. However, at block 304, if the decentralized identity associated with blockchain IoT device 102 is successfully verified, the event data received from blockchain IoT device 102 may be processed by blockchain IoT management sub-system 110 to generate processed event data, at block 306. Additional details of the processing involved at block 306 is described in greater detail in conjunction with FIGS. 1 and 4. Once the processed data is generated, at block 308, blockchain IoT management sub-system 110 may submit the processed event data to blockchain ledger sub-system 112 for storing the processed event data in distributed ledger 116. Alternatively or additionally, in some examples, blockchain ledger sub-system 112 may store the processed event data in distributed ledger 116 as a verifiable claim to prove that blockchain ledger sub-system 112 possesses verifiable credentials with certain characteristics. The verifiable claim may represent the processed event data signed by blockchain ledger sub-system 112 using the verifiable credentials associated with the blockchain ledger sub-system 112. The verifiable credentials may be verified by any verifier in blockchain network 104. In particular, information of the processed event data and/or the verifiable claim may be stored as a block in a blockchain of chronologically ordered, back-link listed data blocks.

Figure 4:
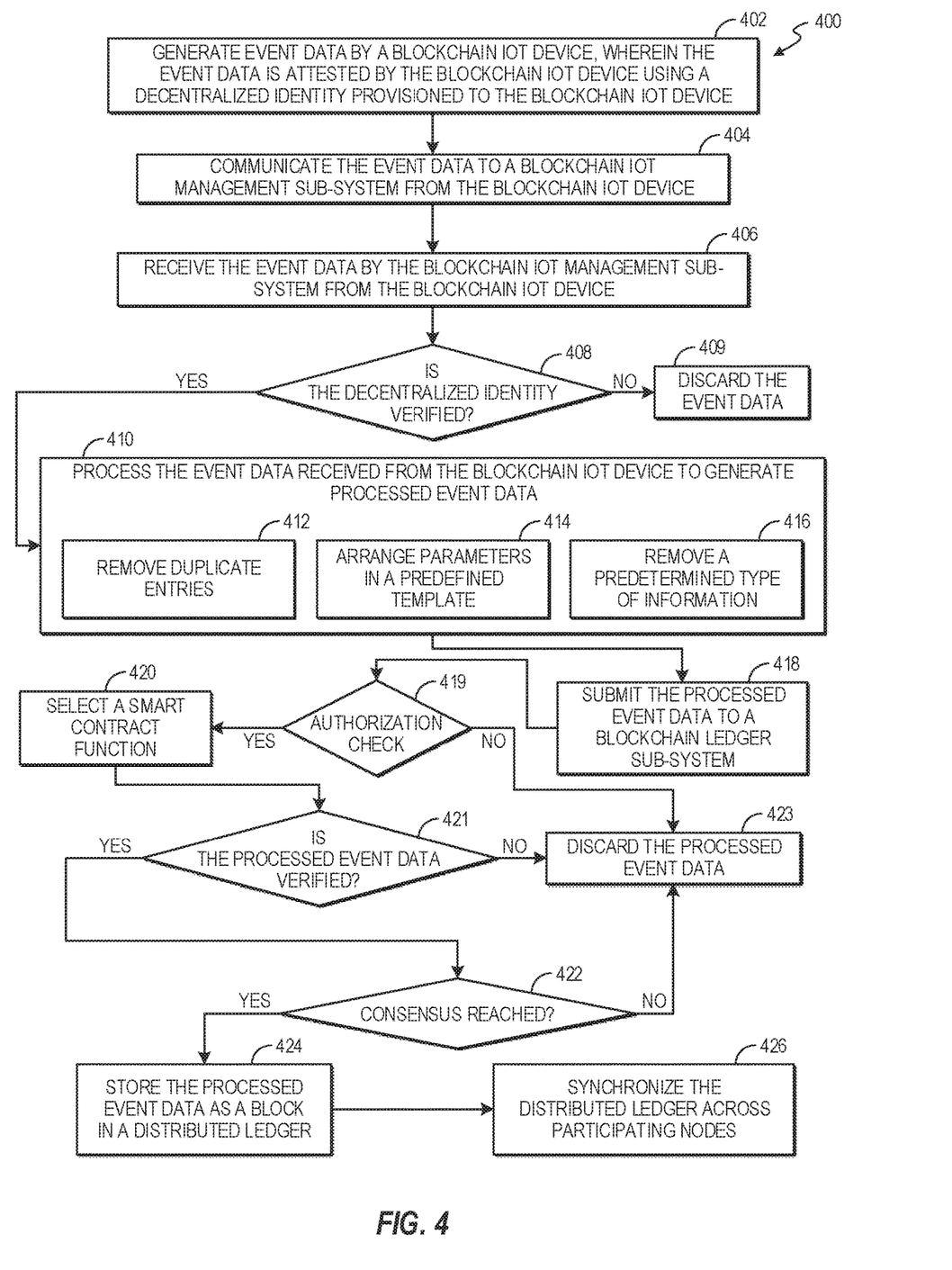
FIG. 4 is a flow diagram depicting a method for storing IoT device data in a blockchain system, in accordance with another example.

Referring now to FIG. 4, a flow diagram depicting a detailed method 400 for storing IoT device data as a blockchain in blockchain network 104 is presented, in accordance with an example. For ease of illustration, method 400 will be described with reference to blockchain IoT system 100 of FIG. 1. As will be appreciated, features described herein are also applicable to blockchain IoT system 200 of FIG. 2.

At block 402, blockchain IoT device 102 may generate event data. As previously noted, the event data may be attested by blockchain IoT device 102 using the decentralized identity provisioned to blockchain IoT device 102. At block 404, the event data may be communicated to blockchain IoT management sub-system 110 from blockchain IoT device 102 over network 106. Blocks 406, 408, and 409 of method 400 are analogues to blocks 302, 304, and 305, respectively, of method 300 of FIG. 3. Accordingly, description of blocks 406, 408, and 409 is not repeated herein.

Further, at block 408, if the decentralized identity associated with blockchain IoT device 102 is not verified, blockchain IoT management sub-system 110 may discard the event data received from blockchain IoT device 102, as indicated by block 409. However, at block 408, if the decentralized identity associated with blockchain IoT device 102 is successfully verified, the event data received from blockchain IoT device 102 is processed by blockchain IoT management sub-system 110 to generate processed event data at block 410. In some examples, processing of the event data at block 410 includes performing operations at one or more of blocks 412, 414, or 416. In some examples, at block 412, method 400 includes removing duplicate entries from the event data. In some examples, at block 414, method 400 includes arranging parameters in the event data in a predefined template. In some examples, at block 416, method 400 includes removing a predetermined type of information from the event data thereby retaining at least some contextual information of the event data. Additional details of the operations performed at blocks 412, 414, and 416 have been described in conjunction with FIG. 1.

Further, once the processed data is generated, at block 418, blockchain IoT management sub-system 110 may submit the processed event data to blockchain ledger sub-system 112. Upon receipt of the processed event data, at block 419, blockchain ledger sub-system 112 may perform an authorization check for the one or both of blockchain IoT device 102 or Blockchain IoT management sub-system 110 based on identities of the blockchain IoT device 102 and the blockchain IoT management sub-system 110. In some examples, the authorization check may also take into account the values of parameters contained in the processed event data in addition to the identities of the submitting devices (e.g., blockchain IoT device 102 and/or blockchain IoT management sub-system 110). Details of the authorization check performed by blockchain ledger sub-system 112 is described in conjunction with FIG. 1.

At block 419, if blockchain IoT device 102 or Blockchain IoT management sub-system 110 is not authorized by blockchain ledger sub-system 112, blockchain ledger sub-system 112 may discard the processed event data at block 423. However, at block 419, if blockchain IoT device 102 and Blockchain IoT management sub-system 110 are authorized by blockchain ledger sub-system 112, at block 420, blockchain ledger sub-system 112 may select a smart contract function corresponding to one or more of blockchain IoT device 102, blockchain IoT management sub-system 110, and/or the parameters contained in the processed event data. For example, for a particular blockchain IoT device, in a given context, only certain parameters may be expected in the processed event data. Accordingly, blockchain ledger sub-system 112 may select a particular smart contract function related to the particular blockchain IoT device and the parameters that may be expected from the particular blockchain IoT device.

Furthermore, at block 421, a check may be performed by blockchain ledger sub-system 112 to verify the processed event data. In some examples, blockchain ledger sub-system 112 may perform the check by executing the selected smart contract function to verify processed event data for storing the event data in distributed ledger 116. At block 421, if the processed event data is not verified using the smart contract function, blockchain ledger sub-system 112 may discard the processed event data as indicated by block 423. However, at block 421, if the processed event data is successfully verified using the smart contract function, at block 422, another check may be performed by the blockchain ledger sub-system 112 to determine whether consensus for storing the processed event data was reached among participating nodes 112, 114 in blockchain network 104. As previously noted, consensus mechanisms used to determine the consensus for storing the processed event among participating nodes 112, 114 may include, but are not limited to, proof of work, proof of stake, proof of elapsed time, Kafka, etc.

At block 422, if no consensus for storing the processed event data was reached among participating nodes 112, 114, blockchain ledger sub-system 112 may discard the processed event data, as indicated by block 423. However, at block 422, if consensus for storing the processed event data was reached among all or a predetermined majority of participating nodes 112, 114, at block 424, blockchain ledger sub-system 112 may store the processed event data as a record or block in distributed ledger 116. Alternatively or additionally, in some examples, blockchain ledger sub-system 112 may store the processed event data in distributed ledger 116 as a verifiable claim to prove that blockchain ledger sub-system 112 possesses verifiable credentials with certain characteristics. The verifiable claim may represent the processed event data signed by blockchain ledger sub-system 112 using the verifiable credentials associated with the blockchain ledger sub-system 112. As noted earlier, information of the processed event data and/or the verifiable claim may be stored as a block in a blockchain of chronologically ordered, back-link listed data blocks. Moreover, at block 426, the distributed ledger on each of participating nodes 110, 112, 114 may be synchronized such that the distributed ledger on each of participating nodes 112, 114 stores identical data.

Figure 5:
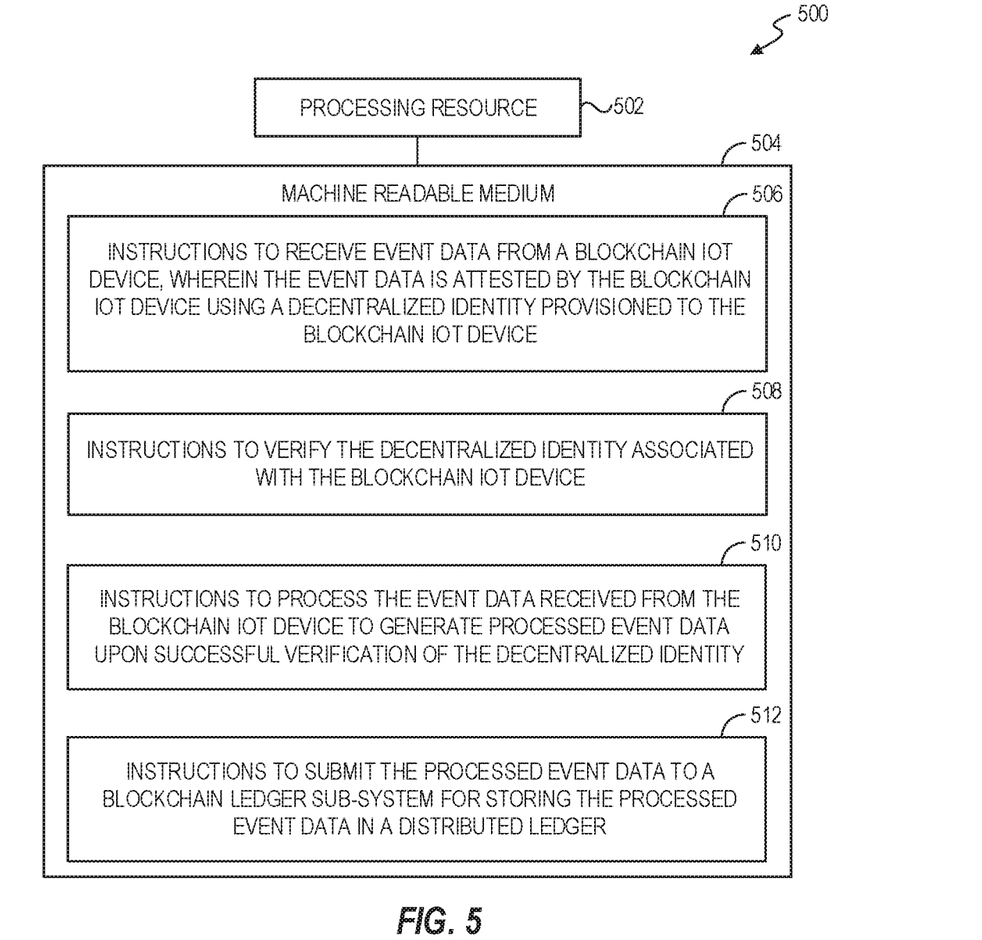
FIG. 5 is a block diagram depicting a processing resource and a machine readable medium encoded with example instructions to store IoT device data in a blockchain system, in accordance with an example.

Referring now to FIG. 5, a block diagram 500 depicting a processing resource 502 and a machine readable medium 504 encoded with example instructions to store IoT device data as blockchain in blockchain network 104 is presented, in accordance with an example. Machine readable medium 504 is non-transitory and is alternatively referred to as a non-transitory machine readable medium 504. In some examples, machine readable medium 504 may be accessed by processing resource 502. In some examples, processing resource 502 and machine readable medium 504 may be included in a participating node, for example, blockchain IoT management sub-system 110 in blockchain network 104.

Non-limiting examples of processing resource 502 may include a microcontroller, a microprocessor, central processing unit core(s), an application-specific integrated circuit (ASIC), a field programmable gate array (FPGA), etc. Machine readable medium 504 may be a non-transitory storage medium, examples of which include, but are not limited to, a random access memory (RAM), a read-only memory (ROM), an electrically erasable programmable read-only memory (EEPROM), a flash memory, a hard disk drive, etc. Processing resource 502 may execute instructions (i.e., programming or software code) stored in machine readable medium 504 to perform operations desired to be performed by participating nodes 110, 112, 114. Additionally or alternatively, processing resource 502 may include electronic circuitry for performing the functionality described herein.

In some examples, machine readable medium 504 may be encoded with example instructions 506, 508, 510, and 512. Instructions 506, 508, 510, and 512 (hereinafter collectively referred to as instructions 506-512) of FIG. 5, when executed by processing resource 502, may implement aspects of storing the event data generated by blockchain IoT device 102 in blockchain network 104. In particular, instructions 506-512 of FIG. 5 may be useful for performing the functionalities of blockchain IoT management sub-system 110 and the methods described in FIGS. 3 and 4. In the description hereinafter, for ease of illustration, instructions 506-512 will be described with reference to blockchain IoT system 100 of FIG. 1. As will be appreciated, features described herein are also applicable to blockchain IoT system 200 of FIG. 2.

Instructions 506, when executed, may cause processing resource 502 to receive event data from blockchain IoT device 102. The event data may be attested by blockchain IoT device 102 using the decentralized identity provisioned to blockchain IoT device 102. Further, instructions 508, when executed, may cause processing resource 502 to verify the decentralized identity associated with blockchain IoT device 102. Details of verification of the decentralized identity have been described in conjunction with FIGS. 1 and 4. Furthermore, instructions 510, when executed, may cause processing resource 502 to process the event data received from blockchain IoT device 102 to generate processed event data upon successful verification of the decentralized identity. In some examples, processing the event data includes one or more of removing duplicate entries from the event data, arranging parameters contained in the event data in a predefined template, or removing a predetermined type of information from the event data thereby retaining at least some contextual information of the event data. Details of processing the event data have been described in conjunction with FIGS. 1 and 5.

Moreover, instructions 512, when executed, may cause processing resource 502 to submit the processed event data to blockchain ledger sub-system 112 for storing the processed event data in distributed ledger 116 upon successful verification of the processed event data. In some examples, instructions 506-512 may include various instructions to execute at least a part of the methods described in FIGS. 3-4 (described earlier). Also, although not shown in FIG. 5, machine readable medium 504 may also include additional program instructions to perform various other method blocks described in FIGS. 3-4.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A blockchain Internet-of-Things (IoT) system, comprising:
    a blockchain network to communicate with a blockchain IoT device over a network, wherein the blockchain IoT device is to generate event data and attest the event data using a decentralized identity provisioned to the blockchain IoT device, the blockchain network comprising:
    a blockchain IoT management sub-system to:
        receive the event data from the blockchain IoT device,
        verify the decentralized identity associated with the blockchain IoT device, and
        in response to successful verification of the decentralized identity, process the event data; and
    a blockchain ledger sub-system to:
        authorize the blockchain IoT device and blockchain IoT management sub-system based on identities of the blockchain IoT device and the blockchain IoT management sub-system,
        based on the authorization, select a smart contract function corresponding to one or more of the blockchain IoT device, the blockchain IoT management sub-system, and parameters contained in the processed event data,
        verify the processed event data by executing the selected smart contract function,
        in response to successful verification of the processed event data, determine whether consensus for storing the processed event data was reached among participating nodes in the blockchain network, and
        store the processed event data in a distributed ledger in response to successful consensus among the participating nodes.

2. The blockchain IoT system of claim 1, wherein the blockchain IoT device comprises at least one of a radio frequency identification (RFID) tag, an RFID scanner, a Bluetooth device, a Near-Field Communication (NFC) reader, or a Bluetooth reader.

3. The blockchain IoT system of claim 1, wherein the decentralized identity comprises at least one of a public key, a private key, or an attribute issued by the blockchain network.

4. The blockchain IoT system of claim 1, wherein the blockchain IoT management sub-system is to validate a signature in the event data using a reference public key to verify the decentralized identity associated with the blockchain IoT device.

5. The blockchain IoT system of claim 1, wherein the blockchain IoT management sub-system is to remove duplicate entries from the event data, wherein the processed event data comprises the event data including unique entries.

6. The blockchain IoT system of claim 1, wherein the blockchain IoT management sub-system is to arrange parameters contained in the event data in a predefined template, wherein the processed event data comprises the event data arranged in the predefined template.

7. The blockchain IoT system of claim 1, wherein the decentralized identity is provisioned to the blockchain IoT device by the blockchain network.

8. The blockchain IoT system of claim 1, wherein the blockchain ledger sub-system is to:
    store a verifiable claim as a record or block in the distributed ledger in response to the successful consensus among the participating nodes, wherein the verifiable claim represents the processed event data signed using verifiable credentials associated with the blockchain ledger sub-system.

9. A method comprising:
    receiving event data by a blockchain IoT management sub-system from a blockchain IoT device, wherein the event data is attested by the blockchain IoT device using a decentralized identity provisioned to the blockchain IoT device;
    verifying, by the blockchain IoT management sub-system, the decentralized identity associated with the blockchain IoT device;
    processing, by the blockchain IoT management sub-system, the event data received from the blockchain IoT device to generate processed event data in response to successful verification of the decentralized identity;
    submitting, by the blockchain IoT management sub-system, the processed event data to a blockchain ledger sub-system,
    authorizing the blockchain IoT device and blockchain IoT management sub-system based on identities of the blockchain IoT device and the blockchain IoT management sub-system;
    based on the authorization, selecting a smart contract function corresponding to one or more of the blockchain IoT device, the blockchain IoT management sub-system, and parameters in the processed event data;
    verifying, by the blockchain ledger sub-system, the processed event data by executing the selected smart contract function;
    in response to successful verification of the processed event data, determining, by the blockchain ledger sub-system, whether consensus for storing the processed event data was reached among participating nodes in a blockchain network; and
    storing, by the blockchain ledger sub-system, the processed event data as a record or block in a distributed ledger in response to successful consensus among the participating nodes.

10. The method of claim 9, wherein the decentralized identity is provisioned to the blockchain IoT device from the blockchain IoT management sub-system, and wherein the decentralized identity comprises a public key, a private key, an attribute, or combinations thereof.

11. The method of claim 9, wherein the verifying of the decentralized identity comprises validating a signature in the event data using a reference public key to verify the decentralized identity associated with the blockchain IoT device.

12. The method of claim 9, wherein the processing of the event data comprises removing duplicate entries from the event data.

13. The method of claim 9, wherein the processing of the event data comprises arranging parameters in the event data in a predefined template.

14. The method of claim 9, wherein the processing of the event data comprises removing a predetermined type of information from the event data thereby retaining at least contextual information of the event data, and wherein the processed event data comprises the contextual information.

15. The method of claim 9, wherein the verifying of the processed event data comprises checking for presence of unexpected parameters in the processed event data, and disqualifying the processed event data in response to detecting the presence of the unexpected parameters.

16. The method of claim 9, wherein the successful consensus among the participating nodes comprises a consent from a majority of the participating nodes.

17. A non-transitory machine readable medium storing instructions that upon execution cause a processing resource to:
   receive event data from a blockchain IoT device, wherein the event data is attested by the blockchain IoT device using a decentralized identity provisioned to the blockchain IoT device;
   verify the decentralized identity associated with the blockchain IoT device;
   process the event data received from the blockchain IoT device to generate processed event data in response to successful verification of the decentralized identity;
   submit the processed event data to a blockchain ledger sub-system;
   authorize the blockchain IoT device and blockchain IoT management sub-system based on identities of the blockchain IoT device and the blockchain IoT management sub-system;
   based on the authorization, select a smart contract function corresponding to one or more of the blockchain IoT device, the blockchain IoT management sub-system, and parameters in the processed event data;
   verify, by the blockchain ledger sub-system, the processed event data by executing the selected smart contract function;
   in response to successful verification of the processed event data, determine, by the blockchain ledger sub-system, whether consensus for storing the processed event data was reached among participating nodes in a blockchain network; and
   store, by the blockchain ledger sub-system, the processed event data as a record or block in a distributed ledger in response to successful consensus among the participating nodes.

18. The non-transitory machine readable medium of claim 17, wherein the processing of the event data comprises removing duplicate entries from the event data.

19. The non-transitory machine readable medium of claim 17, wherein the processing of the event data comprises arranging parameters contained in the event data in a predefined template.

20. The non-transitory machine readable medium of claim 17, wherein the processing of the event data comprises removing a predetermined type of information from the event data thereby retaining at least contextual information of the event data.

21. The non-transitory machine readable medium of claim 17, wherein the verifying of the decentralized identity comprises validating a signature in the event data using a reference public key.

* * * * *